June 17, 1924.
L. M. LAROSE
1,497,689
DISPLAY DEVICE FOR VEHICLE LICENSE PLATES
Filed Jan. 19, 1923
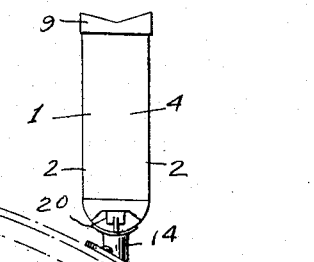
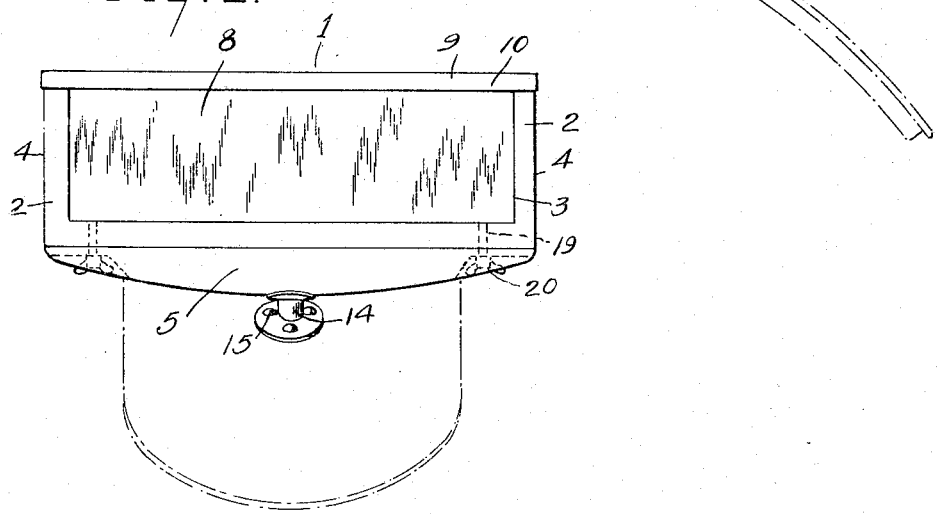
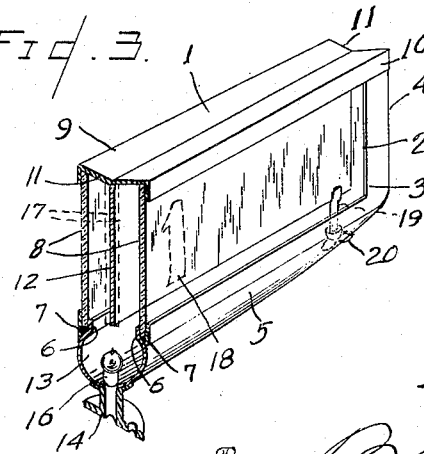
Inventor
Leo M. Larose.
By
Attorney Patented June 17, 1924.

1,497,689

UNITED STATES PATENT OFFICE.

LEO M. LAROSE, OF WINDSOR, ONTARIO, CANADA, ASSIGNOR, BY DIRECT AND MESNE ASSIGNMENTS, TO ISRAEL WEINSTEIN, OF CHICAGO, ILLINOIS.

DISPLAY DEVICE FOR VEHICLE LICENSE PLATES.

Application filed January 19, 1923. Serial No. 613,607.

*To all whom it may concern:*

Be it known that I, Leo M. Larose, a citizen of the Dominion of Canada, residing at Windsor, Ontario, Canada, have invented a new and useful Display Device for Vehicle License Plates, of which the following is a specification.

This invention relates to devices for displaying the license plates of vehicles and particularly of motor vehicles.

It is the object of the invention to provide simple and effective means for mounting the license plates upon a vehicle so that a plurality of such plates may be contained within a common holder and so displayed in opposed relation as to be readily visible from directions respectively forwardly and rearwardly of the vehicle, provision being made for illuminating opposed plates from a common source of light within the container.

In attaining this object the invention contemplates the provision of a housing or casing having opposed alined windows or transparencies in the side walls thereof, the interior of the casing being divided to form separate compartments for said transparencies by a central vertical partition depending from the top wall of said casing and terminating in spaced relation to the bottom wall thereof. Said bottom wall is depressed to form a light chamber in open communication with said compartments and having a light disposed centrally thereof in the plane of said partition for illuminating said compartments in common.

A preferred structural embodiment of the invention is illustrated in the accompanying drawings, in which, Fig. 1 is a view in end elevation of the device mounted upon the mud guard of a vehicle as indicated by dotted lines.

Fig. 2 is a view in side elevation of the device as shown in Fig. 1.

Fig. 3 is a perspective view of the device in central vertical transverse section.

Referring to the parts of the structure by the reference characters on the drawings, 1 designates a sheet metal casing substantially rectangular in form comprising like vertical side walls 2 having alined elongated openings 3 therein and joined by integral end walls 4. The lower edges of the casing are joined and closed by a depressed arcuate bottom wall 5 having the side edges thereof inwardly extending and marginally flanged or offset (as at 6) to form jointly with the side walls channels 7 for the reception of the lower edges of closures 8 for the openings 3. The engaged portions of the bottom and side walls are secured together preferably by soldering.

The top of the casing is closed by a removable cover 9 flanged as at 10 to embrace the ends of the casing and to receive the upper edges of the closure 8 and is centrally depressed longitudinally forming inclined bearing surfaces 11 to retain the upper edges of said closures against inward displacement.

Formed integral with the cover and depending centrally therefrom within the casing is a partition 12 which divides said casing interiorly into two separate compartments. Said partition is spaced at its lower edge from the bottom wall 5 wherein a light chamber 13 is formed in open communication with said compartments.

Secured centrally exteriorly of the bottom wall is a tubular flanged bracket 14 which may be secured by bolts or rivets 15 to mount the casing upon the vehicle and which also serves as a socket for mounting a light 16 within the chamber 13 by which the compartments are illuminated.

The license plates to be displayed may be disposed in opposed relation and secured in any suitable manner upon opposite faces of the partition 12, as indicated by dotted lines 17, in which case the closures 8 should be of transparent material through which the plates illuminated by reflection of the light will be readable exteriorly of the casing, or if desirable the closures 8 may constitute the license plates in the form of transparencies bearing the desired indicia, as indicated by dotted lines at 18, to be illuminated by direct and reflected rays of the light therethrough from the chamber 13, the partition 12 in such case serving as a light reflector and also as a shield to obscure vision through opposed plates and avoid confusing the reading of the indications thereon.

To provide for detachably securing the cover 9 upon the casing the lower edge of the partition 12 is provided adjacent each end with a threaded stem 19 extending through the bottom wall 5 of the casing for engagement with a winged nut 20 by which the cover may be drawn downwardly upon said casing to engage and confine the closures therein; thus the parts may be quickly assembled and securely retained in position and are readily detachable and removable to render the casing interiorly accessible for replacement of plates or lamps as may be required.

It will be apparent that by use of the described device duplicate plates may be prominently displayed upon the vehicle and so illuminated from a common source of light as to expose like indications readable from opposite directions, and that the housing of such plates will serve to protect the same against becoming obscured by accumulation of dust and dirt.

What I claim is:

A device of the character described, comprising a casing having opposed openings extending into the side walls through the upper edges thereof, a closure removably insertable in each opening, a removable cover for the top of said casing engageable with the upper edges of said closures and having a partition depending centrally within said casing, and fastening members detachably connecting said partition with the bottom wall of said casing for retaining said cover and closures removably engaged therewith.

In testimony whereof I sign this specification.

LEO M. LAROSE.